United States Patent Office 2,825,182
Patented Mar. 4, 1958

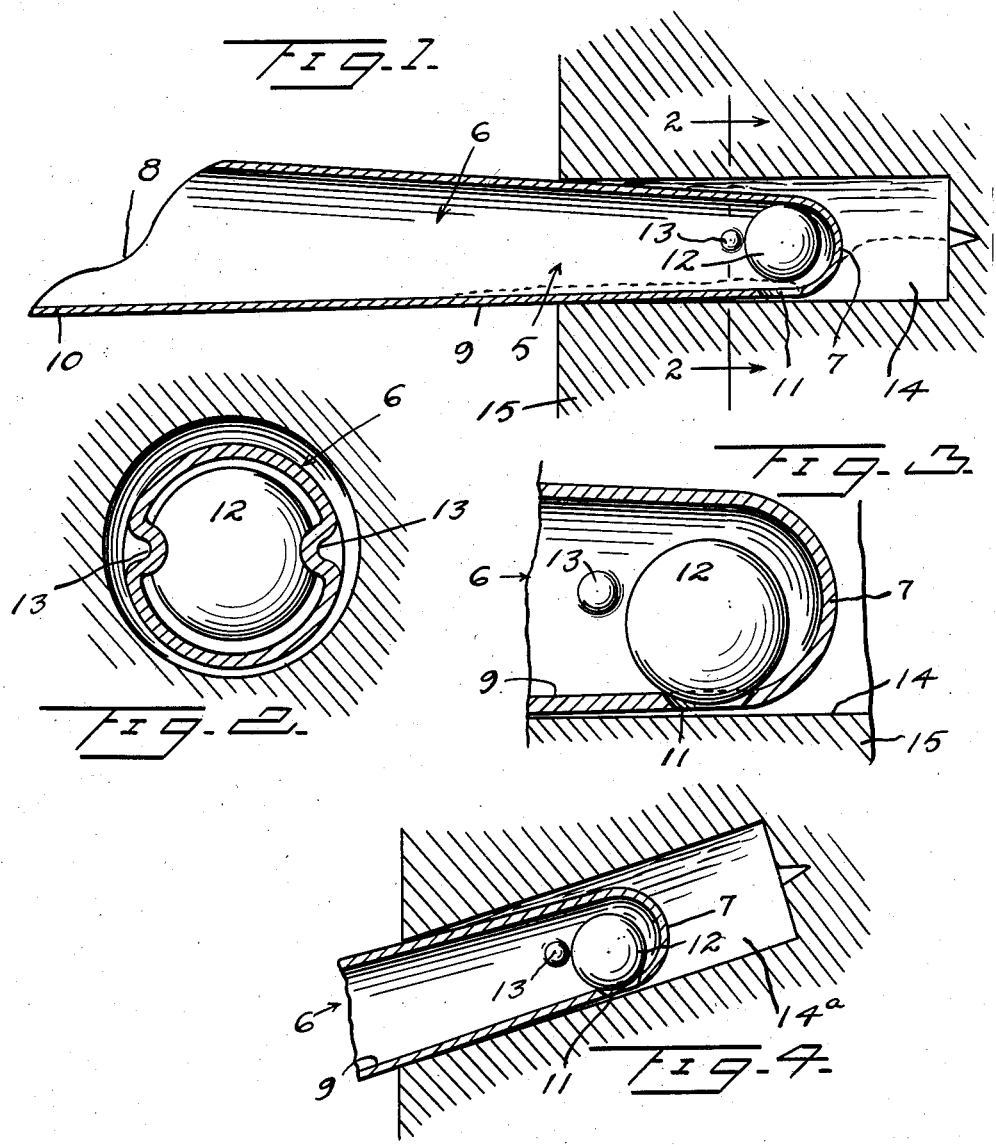

2,825,182
SPILE WITH SHUTOFF MEANS
Henry F. Ayres, Shaftsbury, Vt.
Application February 28, 1955, Serial No. 490,988
2 Claims. (Cl. 47—52)

This invention relates to a spile for use in conducting sap from bores of trees and more particularly sugar maple trees, and has for its primary object to provide a novel shutoff means which will not reduce the flow of the sap through and from the spile but which will prevent a backflow of air inwardly through the spile to the tree bore.

If the temperature falls to below freezing while sap is being collected from maple trees the flow of sap ceases and a vacuum is created in the tree bore which normally causes air to be drawn inwardly through the spile or spout into the bore. This results in oxidizing of the sap which sours readily and forms a scum preventing the sap from again running from the bore through the spile.

Accordingly, it is an object of the present invention to provide a one-way valve means which will permit the sap to flow readily from the tree bore and which will close promptly, when the flow of sap ceases, to prevent air being drawn into the bore to thus prevent oxidizing and souring of the sap and to insure a resumption of flow of the sap when the temperature again rises to above freezing.

A further object of the invention is to provide a valve means of extremely simple construction which will close automatically even though the spile is not disposed with the longitudinal axis thereof in substantially a horizontal plane.

Still a further object of the invention is to provide a shutoff means for a sap spile which will not materially increase the cost of the spile.

Various other objects and advantages of the invention will hereinafter become more fully apparent from the following description of the drawing, illustrating a presently preferred embodiment thereof, and wherein:

Figure 1 is a longitudinal sectional view of the spile shown in an applied position and with the shutoff means in an open position to permit flow of sap outwardly through the spile;

Figure 2 is an enlarged cross sectional view of the spile, taken substantially along a plane as indicated by the line 2—2 of Figure 1;

Figure 3 is an enlarged fragmentary sectional view, partly in elevation, of the inner end portion of the spile showing the shutoff means in a closed postion, and Figure 4 is a fragmentary longitudinal sectional view of the inner end portion of the spile shown mounted at an incline in a tree bore and with the shutoff means in a closed position.

Referring more specifically to the drawing, the spile in its entirety is designated generally 5 and includes an elongated hollow body portion 6 of conical shape or which is tapered longitudinally and which is preferably of substantially circular cross section. The body portion 6 may be formed of metal, plastic or other suitable material and has a hollow rounded closed inner end 7, constituting the restricted end thereof, and an opposite enlarged open end 8. The body portion 6 has an underside or bottom portion 9 extending from end-to-end thereof and which preferably terminates at the open end 8 in an extension forming a drip lip 10. The bottom portion 9, immediately adjacent the hollow rounded closed end 7, is provided with an opening 11 which is preferably chamfered or beveled from top to bottom thereof, as best seen in Figure 3.

A ball valve 12 is mounted in the inner end portion of the body 6, between the rounded end 7 and abutment means 13 which is provided in the body 6, forwardly of and adjacent the opening 11. Any suitable abutment or stop means 13 may be provided to retain the ball valve 12 in the rear end portion of the body 6. As illustrated, side wall portions of the body 6 are provided with indentations constituting said abutment or stop means 13, which are disposed in opposed relation to one another and which are spaced apart a distance less than the diameter of the valve 12, as seen in Figure 2. The ball valve 12 is relatively heavy and is formed of a rust resistant material such as brass, nickel-plated steel, plastic or rubber. The ball is of a diameter only slightly less than the diameter of the body 6 at the opening 11. The diameter of the opening 11 is less than the diameter of the ball valve 12 but greater than the radius thereof to enable the ball valve to effectively seat therein.

The spile 5 is illustrated in the drawing with the restricted end thereof disposed in a tapped bore or recess 14 of a tree, such as a sugar maple tree, a part of which is shown and designated 15. The intermediate part of the spile body 6 fits snugly in and seals the outer end of the bore 14, so that the inner end thereof is spaced from the wall of the bore. Sap from the tree will flow inwardly through the opening 11 from the bore 14 at a pressure up to ten pounds for readily unseating the ball valve 12 to permit the sap to pass along the bottom portion 9 outwardly of the spile 5 to be discharged from the drip lip 10 thereof, in a conventional manner. When the temperature drops below freezing, the flow of sap will immediately cease and a vacuum or suction will be created in the bore 14 up to a pressure of about two pounds. This would normally cause air to be drawn inwardly through the spile body 6 and into the bore 14 through the opening 11 and which oxidizes and sours the sap and forms a scum which will prevent resumption of sap flow. However, as soon as the flow of sap ceases the ball valve 12 will drop by gravity to the seated position as illustrated in Figure 3 to close the opening 11 and thus prevent air entering the bore 14. Additionally, sap remaining around the opening 11 will effectively seal the valve 12 in a closed postion but will not prevent the valve from thereafter being displaced upwardly by the pressure of the sap when the flow of sap is resumed.

As clearly illustrated in the drawing, the spacing between the abutment means 13 and the hollow body end 7 is only slightly greater than the diameter of the valve 12 to insure a seating of the valve and a closing of the opening 11 whenever the flow of sap ceases. Additionally, the valve 12 will readily assume a closed position even though the bore is at an incline either inwardly and upwardly or inwardly and downwardly relative to its outer open end due to the close confining of the ball valve between the abutment means 13 and the body end 7. This is illustrated in Figure 4 and wherein the bore 14a is shown inclined inwardly and upwardly.

Various modifications and changes are contemplated and may obviously be resorted to, without departing from the spirit or scope of the invention as hereinafter defined by the appended claims.

I claim as my invention:

1. A spile of the character described comprising an elongated hollow spile body having an open outer discharge end and a closed hollow opposite end provided with an inlet opening, said open discharge end and said inlet opening constituting the only openings permitting a flow through the spile body, a ball valve disposed in said closed opposite end, and means retaining the valve in a position to close said inlet opening except when the valve is subjected to an external pressure at the inlet opening to permit a flow through the spile body from the inlet opening toward said open discharge end and to prevent a flow through the spile body from the open discharge end toward said inlet opening.

2. A spile as in claim 1, said valve retaining means comprising oppositely disposed identations formed in the spile body and forming internal projections which are spaced apart a distance less than the diameter of the ball valve, said projections being spaced from said closed end of the spile body and being disposed to confine the ball valve adjacent said closed end and adjacent said inlet opening.

References Cited in the file of this patent

UNITED STATES PATENTS

| | | |
|---|---|---|
| 286,443 | Hungerford | Oct. 9, 1883 |
| 542,795 | Cary | July 16, 1895 |
| 729,330 | Grimm | May 26, 1903 |
| 1,154,679 | Whitcomb | Sept. 28, 1915 |
| 1,718,195 | Rankin | June 18, 1929 |

FOREIGN PATENTS

| | | |
|---|---|---|
| 183,179 | Canada | Mar. 26, 1918 |